United States Patent
Tanaka

(12) 
(10) Patent No.: US 6,438,649 B1
(45) Date of Patent: Aug. 20, 2002

(54) AUXILIARY MEMORY DEVICE, METHOD OF SETTING TIME FOR ELECTRONIC DEVICE, AND INFORMATION PROCESSING APPARATUS

(75) Inventor: Makoto Tanaka, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/322,011

(22) Filed: May 28, 1999

(51) Int. Cl.[7] .............................................. G06F 12/00
(52) U.S. Cl. ...................... 711/115; 712/34; 235/380; 235/492; 600/510; 607/59
(58) Field of Search ........................... 711/115; 712/34; 607/59; 600/510; 235/380, 492

(56) References Cited

U.S. PATENT DOCUMENTS 5,749,913 A  *  5/1998  Cole ............................ 607/59
6,006,319 A  * 12/1999  Takahashi et al. ............. 712/34
6,047,207 A  *  4/2000  MacDuff et al. ............. 600/510

FOREIGN PATENT DOCUMENTS

JP          11-39448       *  2/1999

* cited by examiner

Primary Examiner—Hiep T. Nguyen
(74) Attorney, Agent, or Firm—Paul A. Guss

(57) ABSTRACT

An auxiliary memory device which not only stores data, but also measures time information managed by an application program of a main apparatus is provided. The auxiliary memory device has a clock element as a clock unit having a clock function, a power supply for supplying an electric power, a nonvolatile memory for storing data of at least the main apparatus, and a microcomputer having a communicating function for communicating with the main apparatus. The clock element is an element supplied with the electric power from the power supply for continuing a time measuring operation. The nonvolatile memory stores at least time information produced when an application program of a main apparatus is temporarily interrupted.

36 Claims, 15 Drawing Sheets

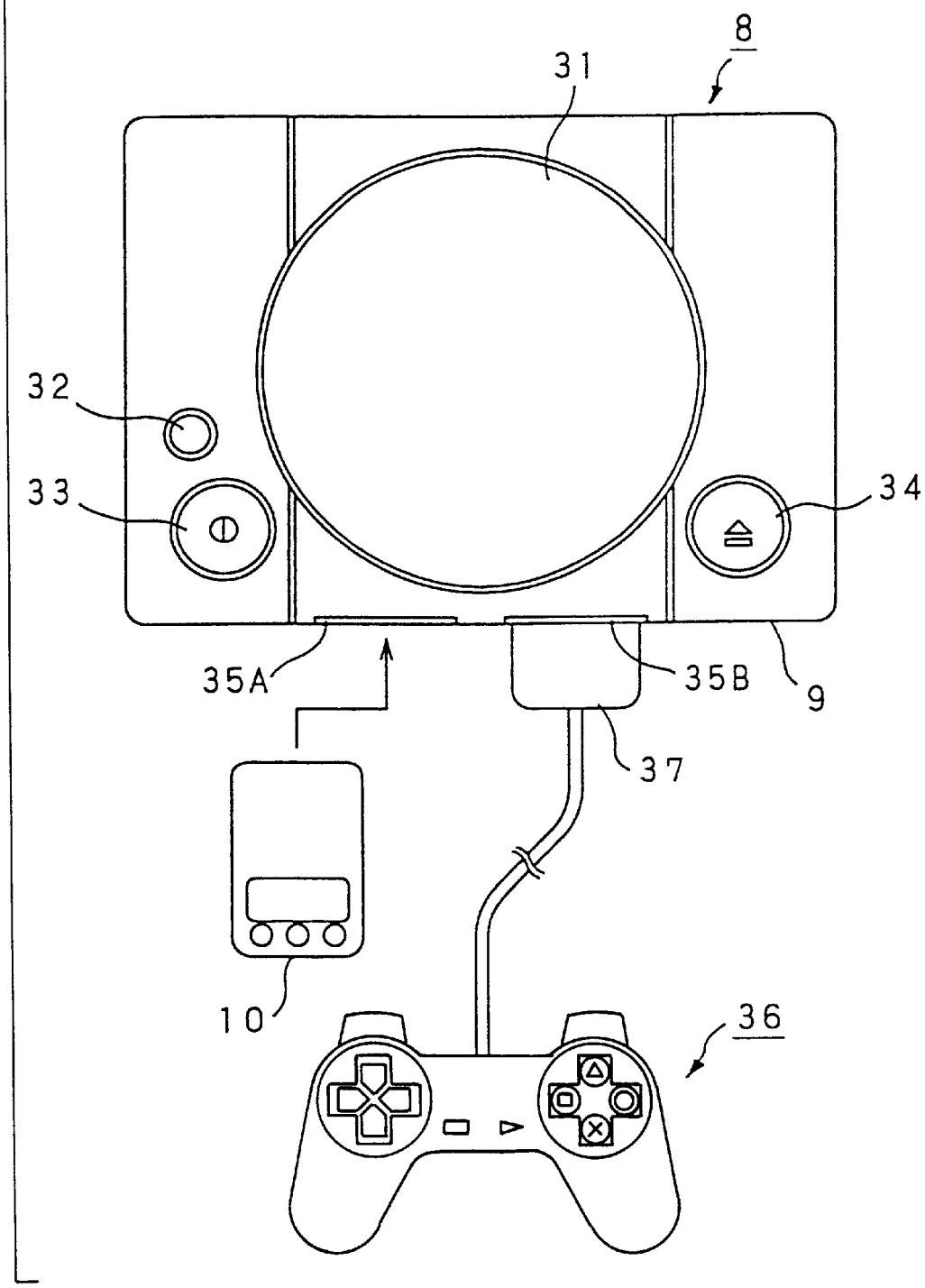

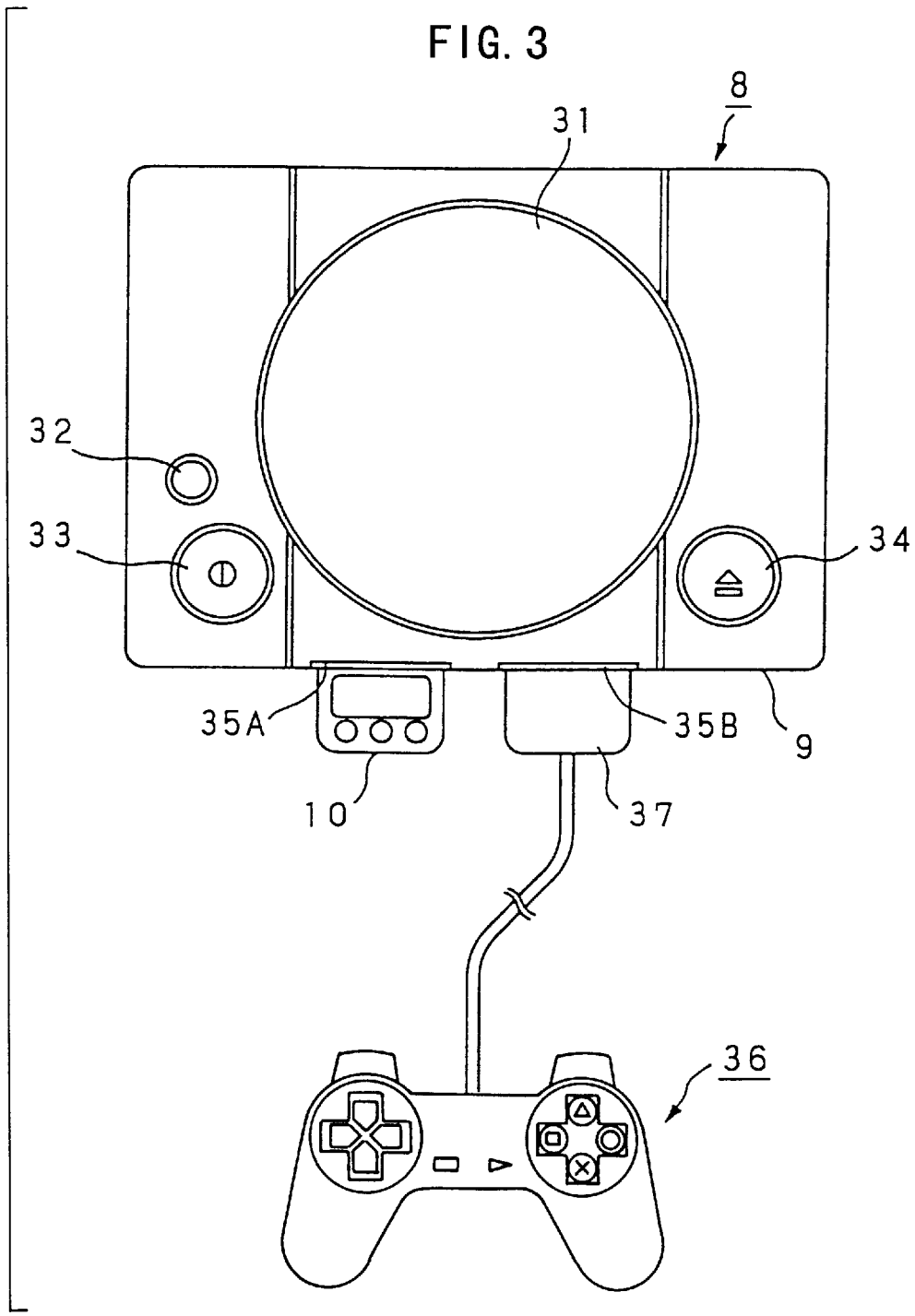

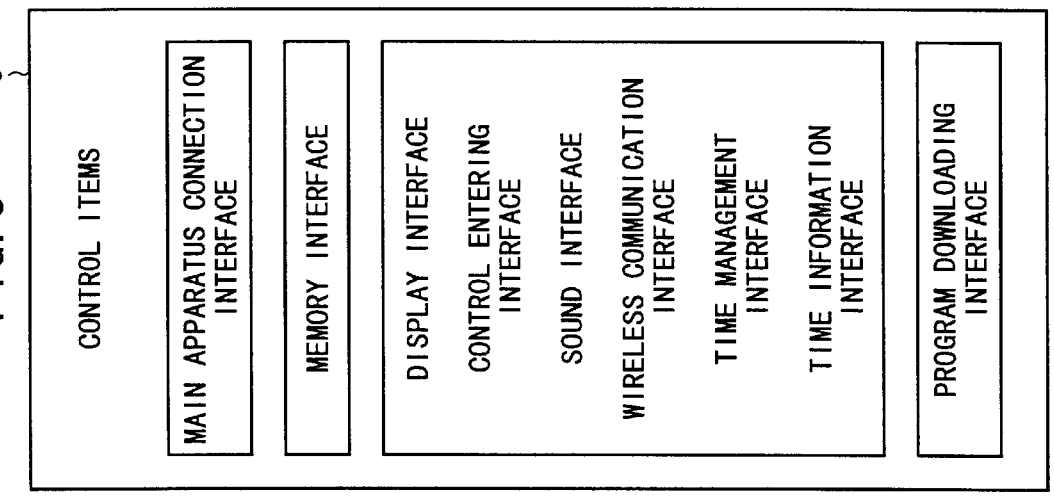
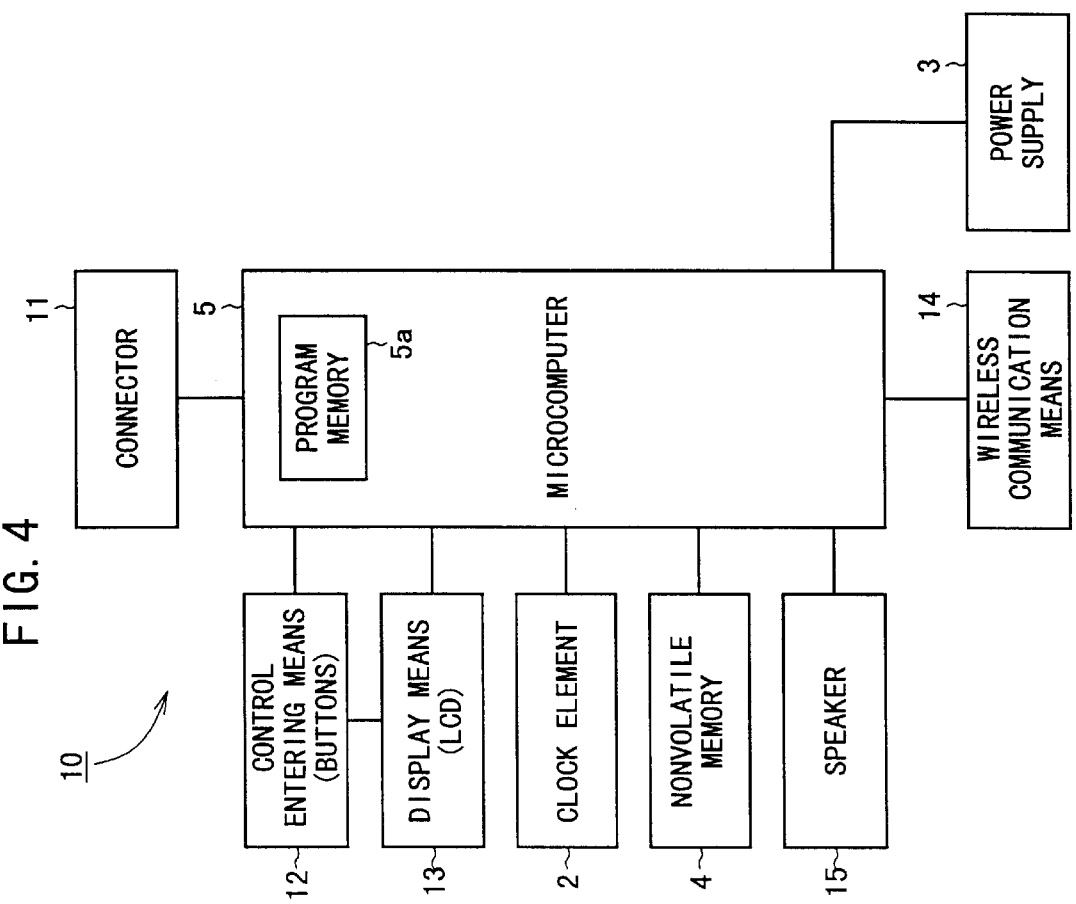

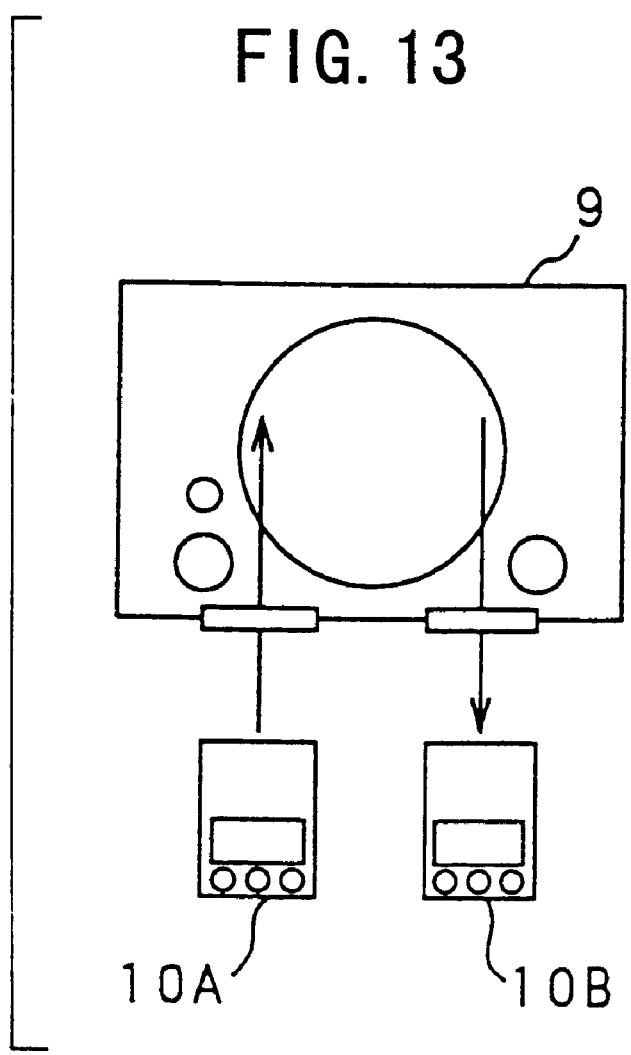

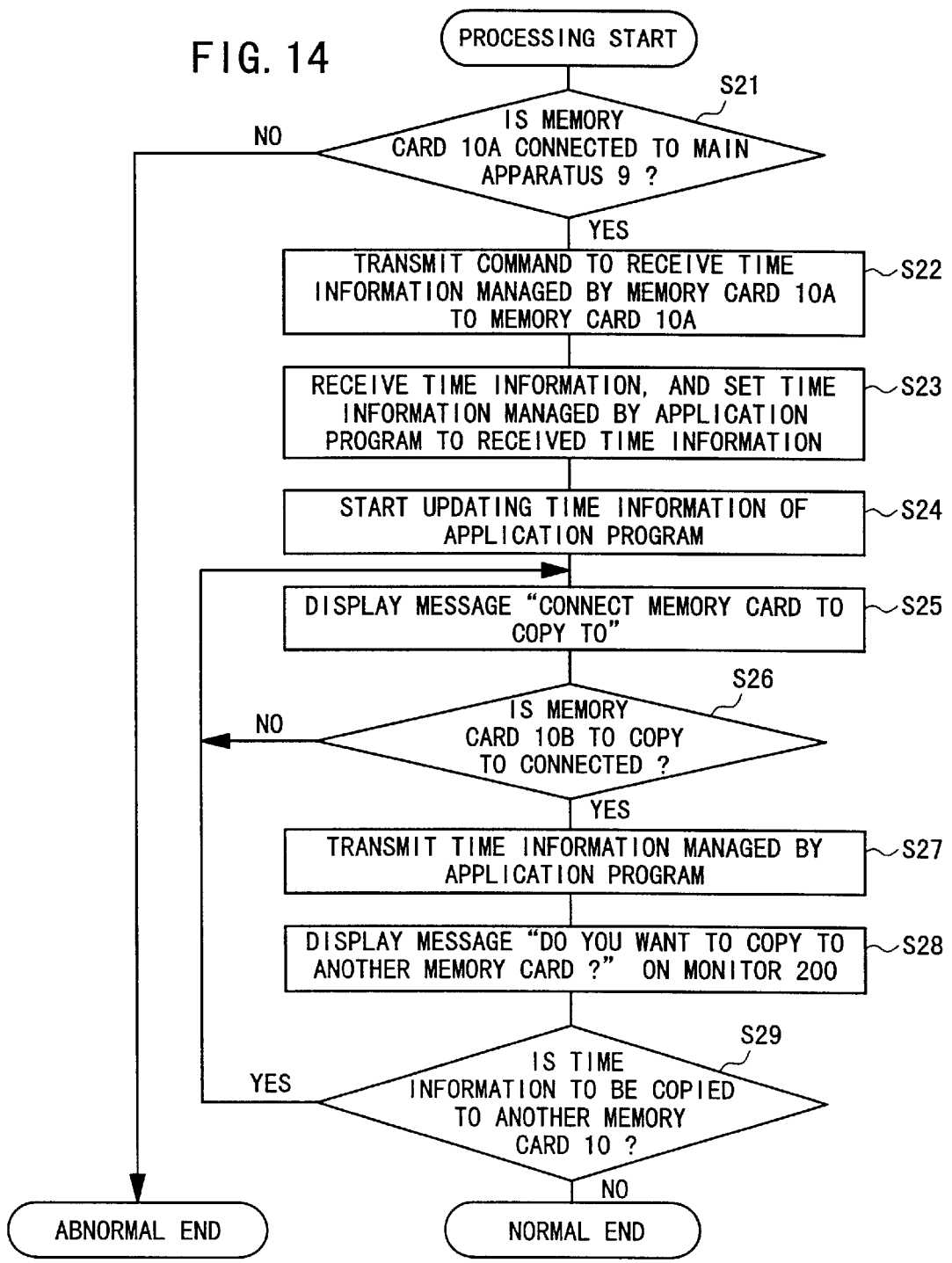

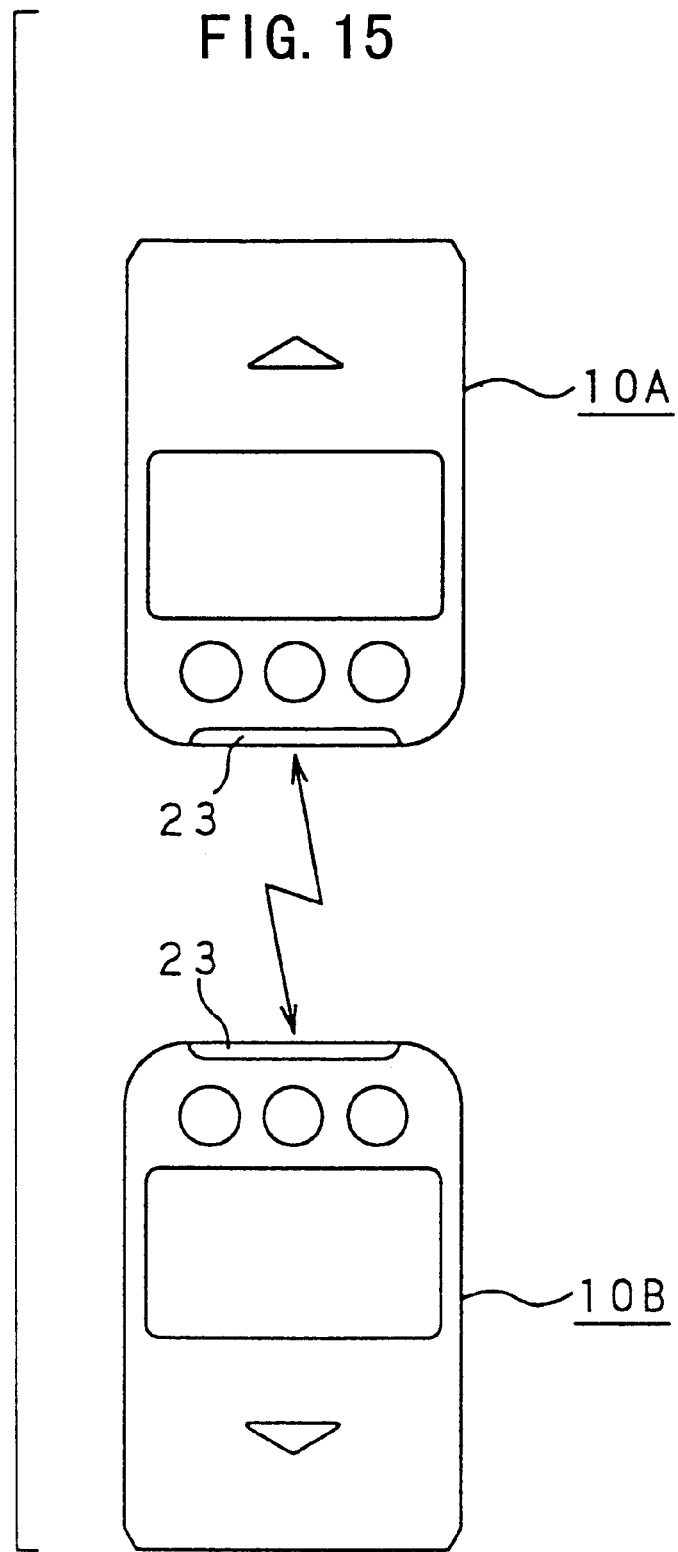

AUXILIARY MEMORY DEVICE, METHOD OF SETTING TIME FOR ELECTRONIC DEVICE, AND INFORMATION PROCESSING APPARATUS

BACKGROUND OF THE INVENTION

1. Field of the Invention

The present invention relates to an auxiliary memory device detachably connected to a main apparatus, for storing data of the main apparatus, a method of setting time for an electronic device to set time information of the electronic device, and an information processing apparatus comprising a main apparatus for processing data according to an application program and an auxiliary memory device for storing data from the main apparatus.

2. Description of the Related Art

Conventional auxiliary memory devices such as memory cards or the like for insertion in information handling apparatus comprise an interface for connection to a main apparatus and a nonvolatile memory for storing data.

FIG. 16 shows an arrangement of major components of a conventional memory card 300. The memory card 300 comprises a control means 301 for controlling operation of the memory card 300, a connector 302 for connecting to terminals disposed in a slot in an information handling apparatus, and a nonvolatile memory 303 for storing data. The connector 302 and the nonvolatile memory 303 are connected to the control means 301.

The control means 301 comprises a microcomputer, for example. The nonvolatile memory 301 comprises a flash memory such as an EEPROM (electrically-erasable programmable read-only memory). An interface for connecting to an information handling apparatus may comprise a microcomputer as a control means for analyzing a protocol.

FIG. 17 shows control items in the control means 301 of the memory card 300.

The memory card 300 only has a main apparatus connection interface for connecting to a main apparatus such as an information handling apparatus and a memory interface for receiving data from and outputting data to the nonvolatile memory.

The memory card 300 is used, for example, as an auxiliary memory device for a conventional video game apparatus such as a home TV game apparatus.

If the memory card 300 is used as an auxiliary memory device for a video game apparatus, then the result of a video game obtained when the application program of the video game is executed and transmitted to the memory card 300 is written into the nonvolatile memory 303 by the control means 301.

As described above, the conventional memory card 300 only has a main apparatus connection interface for connecting to a main apparatus such as an information handling apparatus and a memory interface for receiving data from and outputting data to the nonvolatile memory. Therefore, the conventional memory card 300 simply functions as an auxiliary memory device.

For example, the memory card 300 simply stores the result of a game when the application program which is executed to play the game on the main apparatus is temporarily interrupted.

In recent years, it has been practiced to measure time data according to the actual time while the application program is being temporarily interrupted. Such time data measurement may be achieved by an adapter connected to the main apparatus. However, using the adapter is expensive. It is desirable to be able to measure the time data even if the main apparatus does not have a function to update the time data.

SUMMARY OF THE INVENTION

The present invention has been made in view of the above problems. It is an object of the present invention to provide an auxiliary memory device which not only stores data, but also measures time information managed by an application program of a main apparatus, a method of setting time for an electronic device, and an information processing apparatus.

Since the auxiliary memory device according to the present invention includes a clock unit having a clock function, it can measure time information to update time information.

Therefore, the time information of the application program of the main apparatus to which the auxiliary memory device is connected can be set to the time information measured by the clock unit of the auxiliary memory device.

The method of setting time for an electronic device according to the present invention sets time information managed by the application program of the main apparatus based on time information from the clock unit of the auxiliary memory device. The application program can be executed using the measured time information.

With this method of setting time for an electronic device, therefore, the application program which has temporarily been interrupted by the main apparatus can be resumed using the time information measured by the clock unit of the auxiliary memory device.

Furthermore, the information processing apparatus according to the present invention includes the main apparatus having a processor for processing data transmitted via communication means, and the auxiliary memory device having memory means for storing data to be transmitted to at least the main apparatus, and a clock unit having a clock function. Time information managed by an application program of the main apparatus is set by time information from the clock unit which is transmitted via the communication means. The application program can thus be executed using the measured time information.

The information processing apparatus is therefore capable of resuming the application program which has temporarily be interrupted by the main apparatus, using the time information measured by the clock unit of the auxiliary memory device.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a view showing an appearance of a video game apparatus according to the present invention, illustrating a main apparatus with a memory card to be inserted therein;

FIG. 3 is a view showing the appearance of the video game apparatus according to the present invention, illustrating the main apparatus with the memory card inserted therein;

FIG. 4 is a block diagram of major components of a conventional memory card;

FIG. 5 is a block diagram of control items in the control means of the memory card;

FIG. 13 is a view showing the manner in which saved data, etc. are copied between memory cards via the main apparatus;

FIG. 14 is a flowchart of a process of setting a plurality of memory cards to the same time information;

FIG. 15 is a view showing the manner in which saved data and time information are copied between memory cards via wireless communications;

DETAILED DESCRIPTION OF THE PREFERRED EMBODIMENTS

An embodiment of the present invention will be described below with reference to the drawings. First, an auxiliary memory device according to the present invention will be described, and then an information processing apparatus according to the present invention will be described. A method of setting time for an electronic device according to the present invention is carried out by the auxiliary memory device and the information processing apparatus.

Figure 1:
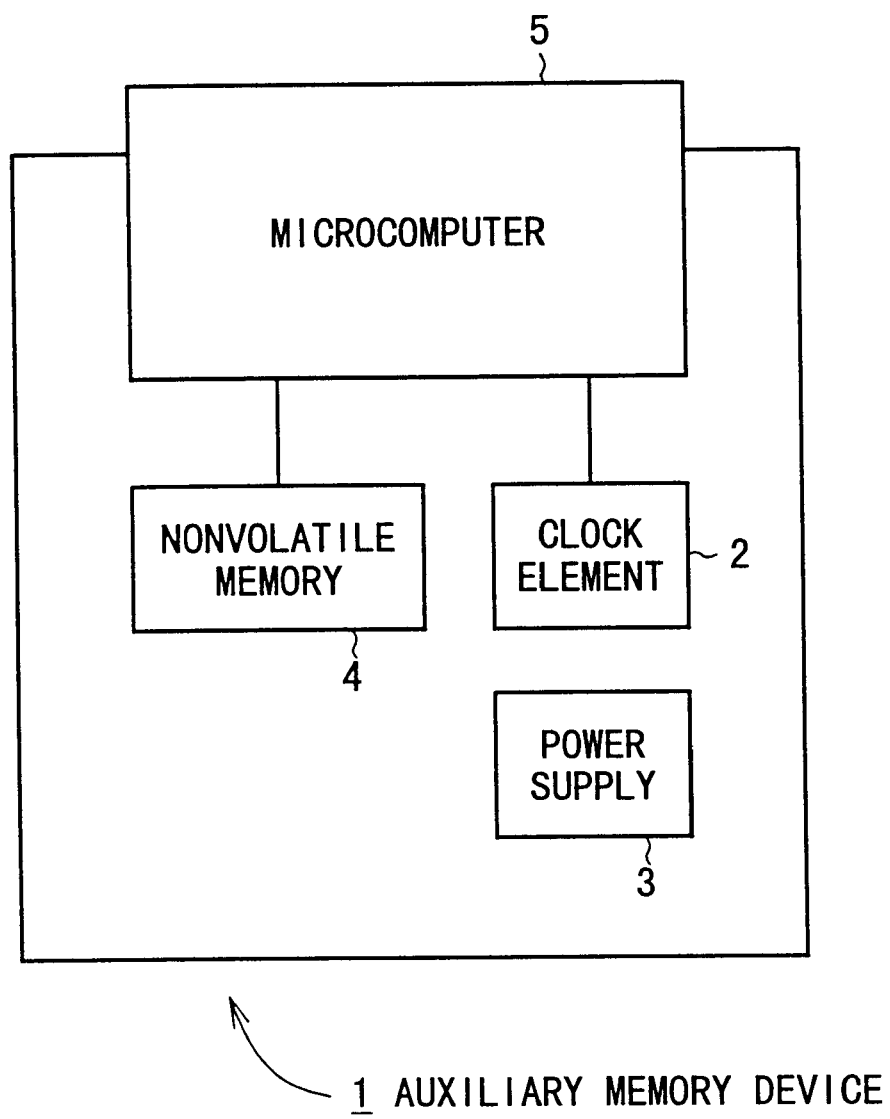
FIG. 1 is a block diagram of an auxiliary memory device according to an embodiment of the present invention.

As shown in FIG. 1, an auxiliary memory device 1 according to the present invention comprises a clock element 2 as a clock unit having a clock function, a power supply 3 as a power supply means for supplying an electric power, a nonvolatile memory 4 as a memory means for storing data of at least a main apparatus, and a microcomputer 5 having a communication function to communicate with the main apparatus.

The clock element 2 is an element supplied with the electric power from the power supply 3 for continuing a time measuring operation. For example, the clock element 2 measures time as time elapses after it has been set to a time.

The power supply 3 is a power supply means for supplying an electric power to various parts of the auxiliary memory device 1. Because of the power supply 3, the auxiliary memory device 1 is able to perform the functions of the various parts thereof even when it is supplied with no electric power from the main apparatus, e.g., even when it is disconnected from the main apparatus. The power supply 3 may be a rechargeable power supply. If the power supply 3 is a rechargeable power supply, then the auxiliary memory device 1 is supplied with an electric power from the main apparatus while the auxiliary memory device 1 is being inserted in the main apparatus.

The nonvolatile memory 4 comprises a semiconductor memory such as a flash memory which can keep stored data even when the power supply therefor is turned off. Since the auxiliary memory device 1 has the power supply 3, the nonvolatile memory 4 may comprise a static random-access memory (SRAM) capable of reading and outputting data at high speed. For example, the nonvolatile memory 4 may store data transmitted to and received from the main apparatus.

The microcomputer 5 is arranged to control the various parts of the auxiliary memory device 1. Since the microcomputer 5 has a communication function, as described above, it can transmit data stored in the nonvolatile memory 4 to the main apparatus to which the auxiliary memory device 1 is connected.

The auxiliary memory device 1 serves to store data transmitted from the main apparatus. For example, as shown in FIG. 2, the auxiliary memory device 1 is used as a memory card 10 for a video game apparatus 8, and can store data produced by an application program of the main apparatus.

The auxiliary memory device 1 can store, in the nonvolatile memory 4, data of the application program of the main apparatus, for example, interim data produced when the application program is temporarily interrupted, and time information.

The auxiliary memory device 1 can set the clock element 2 to a time in response to a command or the like from the main apparatus.

Since the auxiliary memory device 1 is supplied with an electric power from the power supply 3, the auxiliary memory device 1 keeps operating even when disconnected from the main apparatus. Therefore, even when the auxiliary memory device 1 is disconnected from the main apparatus, the clock element 2 can measure time information.

The auxiliary memory device 1 can transfer data saved by the microcomputer 5 and the time information measured as described above to the main apparatus in response to a command or the like.

Specifically, the auxiliary memory device 1 with the above functions is capable of carrying out the following operations.

When the application program of the main apparatus is temporarily interrupted, for example, data and time information managed by the application program are saved in the auxiliary memory device 1. Thereafter, the main apparatus finishes the application program, and turns off its power supply thereby to temporarily interrupt its operation.

When the main apparatus temporarily interrupts its operation, the main apparatus sends a command for setting time information to the auxiliary memory device 1. In response to the command, the auxiliary memory device 1 sets the clock element 2 to a time, and the clock element 2 starts measuring time from the set time. In the embodiment of the present invention, the clock element 2 is set to a time each time the main apparatus temporarily interrupts its operation, in response to a command set from the main apparatus.

Inasmuch as the auxiliary memory device 1 has the power supply 3, the clock element 2 keeps measuring time even when the auxiliary memory device 1 is disconnected from the main apparatus, e.g., even when the auxiliary memory device 1 is being carried around.

For resuming the application program of the main apparatus, the auxiliary memory device 1 is inserted in the main apparatus, and transfers the present time information which is being continuously measured by the clock element 2, together with the saved data including the time information, to the main apparatus.

The main apparatus resumes the application program based on the transferred saved data including the time information and the present time information. The time information included in the saved data represents the time when the application program was temporarily interrupted, and the present time information from the clock element 2 represents the time measured in the auxiliary memory device 1 as the actual time elapses. The time information managed by the application program is set by the present time information thus measured.

Therefore, the main apparatus resumes the application program whose time information is set to the time information reflecting the period from the temporary interruption to the resumption, which period has been measured as the actual time has elapsed.

For example, the application program processes game data to include a progress during the elapsed time based on elapsed time data produced by comparing the time information managed by the clock element 2 upon the temporary interruption and the time information managed by the clock element 2 measured at the time of the resumption, and the saved data including the time information which was managed by the application program and saved in the auxiliary memory device at the time of the temporary interruption.

After the main apparatus has resumed the application program, the time information is managed by the application program.

The auxiliary memory device 1 may not set the clock element 2 to a time each time the main apparatus temporarily interrupts its operation. After the clock element 2 is initialized by an initializing operation of the application program of the main apparatus, the auxiliary memory device 1 may not update the setting of the clock element 2.

With such a modification, after the clock element 2 is initialized, the time of the clock element 2 is not changed. Therefore, using the time information measured by the clock element 2 as a reference, time information as to each of a plurality of application programs can be obtained by saving time difference information of those application programs.

The auxiliary memory device 1 used-as a memory card for saving data of an information processing apparatus, specifically, as a memory card detachably inserted in a video game apparatus as an information processing apparatus, will be described below.

The memory card is of a structure identical to the auxiliary memory device 1. Therefore, the parts of the memory card which are identical to those of the auxiliary memory device 1 are denoted by identical reference characters, and will not be described in detail below.

As shown in FIGS. 2 and 3, a video game apparatus 8 comprises a main apparatus 9 for processing game data according to an application program, and a memory card 10 for storing game data from the main apparatus 9. FIG. 2 shows the video game apparatus 8 with the memory card 10 to be inserted into the main apparatus 10, and FIG. 3 shows the video game apparatus 8 with the memory card 10 inserted into the main apparatus 10.

As shown in FIG. 4, the memory card 10 has a clock element 2, a power supply 3, a nonvolatile memory 4, and a microcomputer 5 which includes a program memory 5a for storing a program. The memory card 10, as it is used with the video game apparatus 8, also has a connector 11 for insertion into a slot in the main apparatus 9 of the video game apparatus 8, button switches 12 as a control entering means for controlling a program in the program memory 5a, a display unit 13 such as a liquid crystal display (LCD) as a display means for displaying various items of information according to the program, a wireless communication means 14 for transmitting data to and receiving data from another memory card or the like with infrared rays, and a speaker 15 as a sound generating means for generating sounds according to the program.

The parts of the memory card 10 are connected to the microcomputer 5 as a control means, and are operated under the control of the microcomputer 5.

FIG. 5 shows control items of the microcomputer 5. The memory card 10 has a main apparatus connection interface for connecting to an information handling apparatus, a memory interface for receiving data from and outputting data to a memory, a display interface, a control entering interface, a sound interface, a wireless communication interface, a time management interface, a time information interface, and a program downloading interface.

Figure 6A:
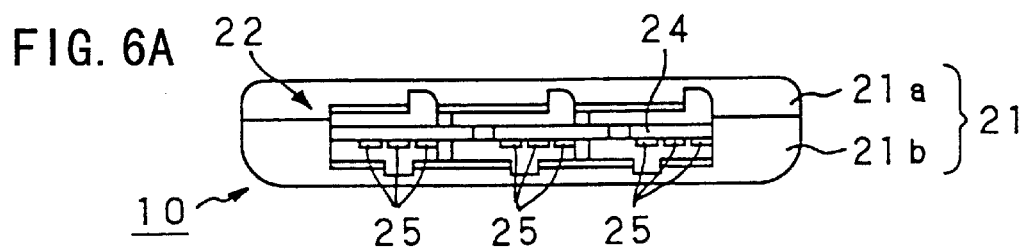
FIG. 6A is view showing a side face of the insertion side of the memory card which will be inserted into the main apparatus.
Figure 6B:
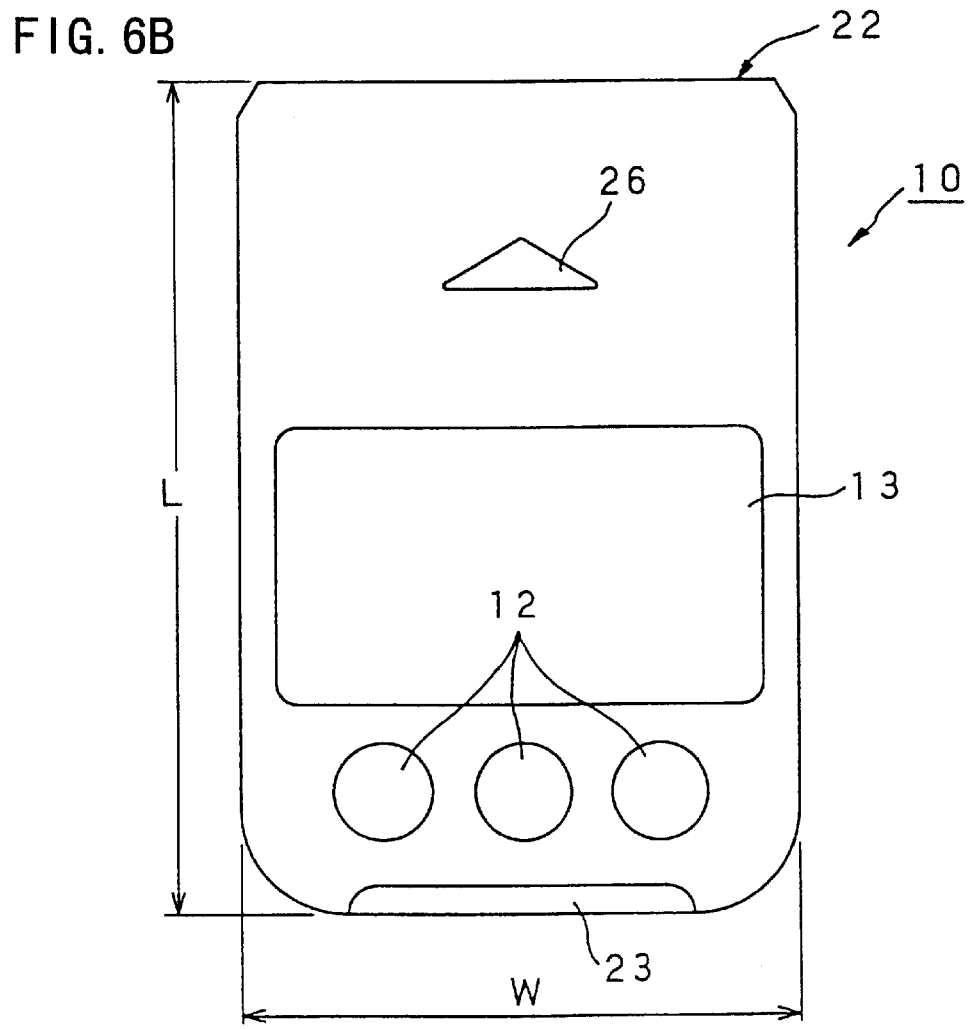
FIG. 6B is view showing an upper face of the memory card.
Figure 6C:
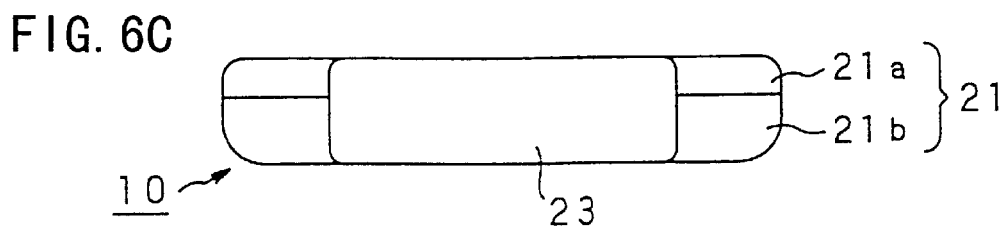
FIG. 6C is view showing a side face of the memory card which is opposite to the insertion side thereof.

The memory card 10 has an appearance as shown in FIGS. 6A through 6C. FIG. 6B shows an upper face of the memory card 10. FIG. 6A shows a side face of the insertion side of the memory card 10 which will be inserted into the main apparatus 9. FIG. 6C shows a side face of the memory card 10 which is opposite to the insertion side thereof.

As shown in FIGS. 6A through 6C, the memory card 10 comprises a housing 21 having an upper shell 21a and a lower shell 21b, the housing 21 being substantially in the form of a rectangular parallelepiped. The memory card 10 has button switches 12, a display unit 13, a connector 22, and a wireless communication window 23 through which a wireless communication means 14 performs infrared wireless communications. The memory card 10 accommodates a board 24 with a memory device, etc. mounted thereon in the housing 21.

The housing 21 has a rectangular window defined in an end thereof which houses the connector 22 for insertion into a slot 35A or 35B (see FIG. 7) defined in the main apparatus 9.

The housing 21 has on its upper panel an orientation mark 26 indicative of the direction in which to insert the memory card 10 into a memory card insertion area 38A or 38B (see FIG. 7) of the main apparatus 9. The user can easily recognize the orientation and upper face of the memory card 10 with the mark 26 when inserting the memory mark 26 into the main apparatus 9. The mark 26 is not limited to the illustrated shape. The mark 26 may be shaped so as to act as a slip prevention device when the memory mark 26 is inserted into the slot 35A or 35B in the main apparatus 9.

The memory card 10 has a shape and dimensions W, L which are the same as those of a conventional memory card used with the conventional video game apparatus. The connector 22 has power and signal terminals 25 mounted on the board 24 and disposed in the window in the housing 21. The wireless communication window 23 is defined in an end of the housing 21 opposite to the connector 22.

The memory card 10 of the above construction is detachably inserted in the main apparatus 9 of the video game apparatus, as shown in FIGS. 2 and 3.

As shown in FIGS. 2 and 3, the main apparatus 9 is substantially in the shape of a rectangular parallelepiped, and has a disk loading unit 31 disposed centrally therein for loading an optical disk (CD-ROM) as a recording medium for supplying the application program of a video game, a reset switch 32 for resetting the video game as desired, a power supply switch 33, and an operating switch 34 for inserting and ejecting the optical disk. The main apparatus 9 also has the above two slots 35A, 35B.

A recording medium for supplying the application program of a video game is not limited to an optical disk, but may be supplied via a communication link.

Figure 7:
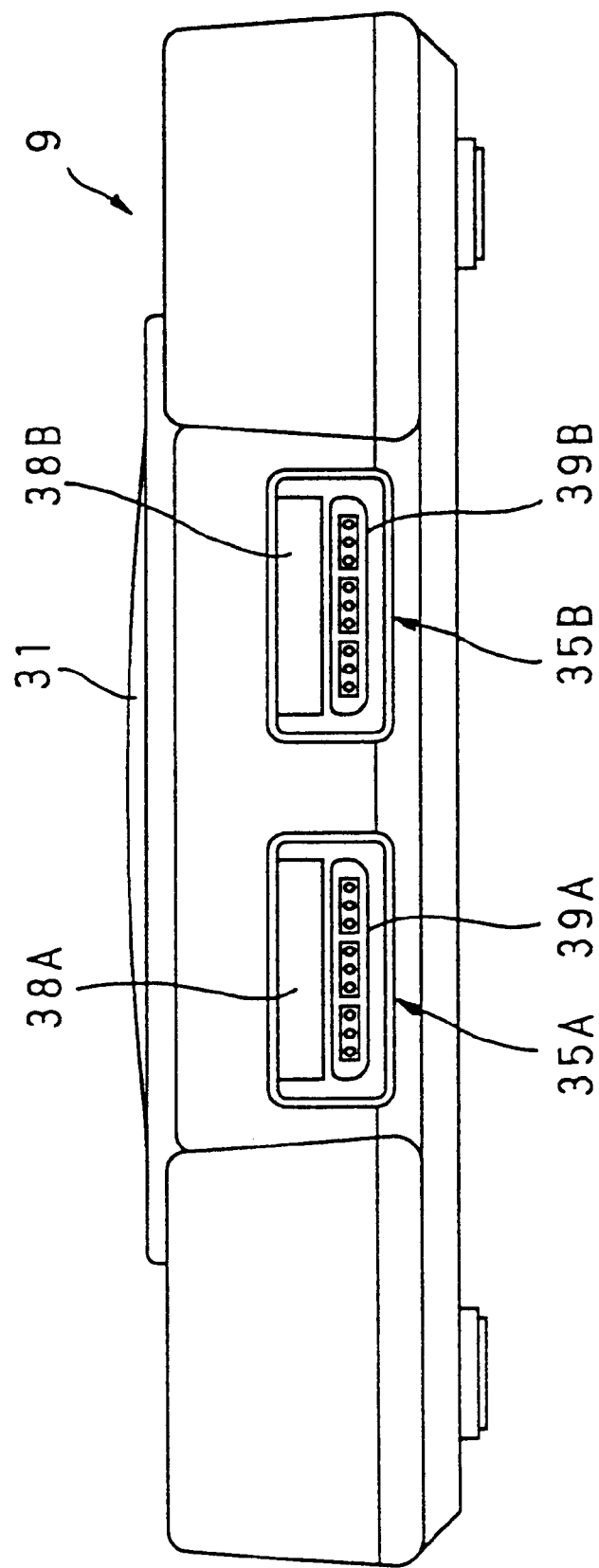
FIG. 7 is a view showing slots in a main apparatus of the video game apparatus.

As shown in FIG. 7, the slots 35A, 35B are defined in a front side face of the main apparatus 9.

The slots 35A, 35B each have two upper and lower sections. Specifically, the slots 35A, 35B have in their upper sections the respective memory card insertion areas 38A, 38B for inserting the memory card 10 therein, and in their lower sections respective controller connectors 39A, 39B for connection to a connector terminal 37 of a controller 36 shown in FIGS. 2 and 3.

The memory card insertion areas 38A, 38B have respective insertion holes (slots) that are of a horizontally elongate rectangular shape. These insertion slots have lower opposite corners round in contrast to upper opposite corners thereof so that the memory card 10 will not be inserted into the memory card insertion areas 38A, 38B in the wrong orientation. The memory card insertion areas 38A, 38B also have shutters for protecting connection terminals disposed therein for electric connection.

The controller connectors 39A, 39B also have respective insertion holes (slots) that are of a horizontally elongate rectangular shape. These insertion slots have lower opposite corners round in contrast to upper opposite corners thereof so that the connector terminal 37 of the controller 36 will not be connected to the controller connectors 39A, 39B in the wrong orientation. The insertion holes of the controller connectors 39A, 39B are different. in shape from the insertion holes of the memory card insertion areas 38A, 38B so that the memory card 10 will not be inserted into the insertion holes of the controller connectors 39A, 39B.

In FIGS. 2 and 3, the memory card 10 is inserted in the memory card insertion area 38A in the slot 35A, and the controller 36 is connected to the controller connector 39B in the slot 35B. Controllers 36 may be connected to the controller connectors 39A, 39B, respectively, for thereby allowing two users to play a competition video game, for example. While the memory card 10 is inserted in the memory card insertion area 38A in the slot 35A in the illustrated embodiment, the memory card 10 may be inserted in the memory card insertion area 38B in the slot 35B for connection to the main apparatus 9.

In FIGS. 2, 6A, 6B,6C, and 7, the main apparatus 9 has the two slots 35A, 35B. However, the main apparatus 9 may have more or less slots.

Figure 8:
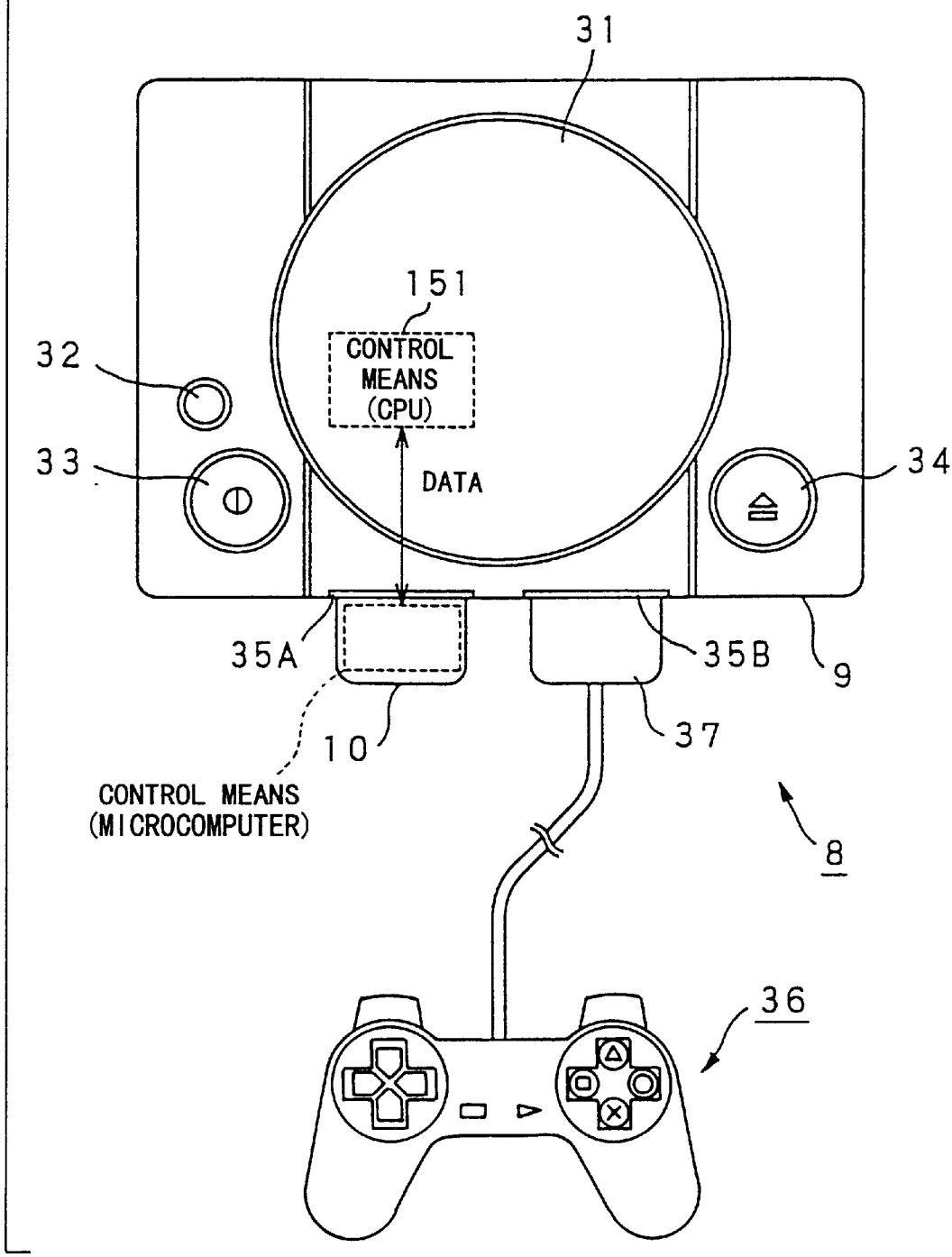
FIG. 8 is a view illustrative of coordinated operation of the main apparatus and the memory card.
Figure 9:
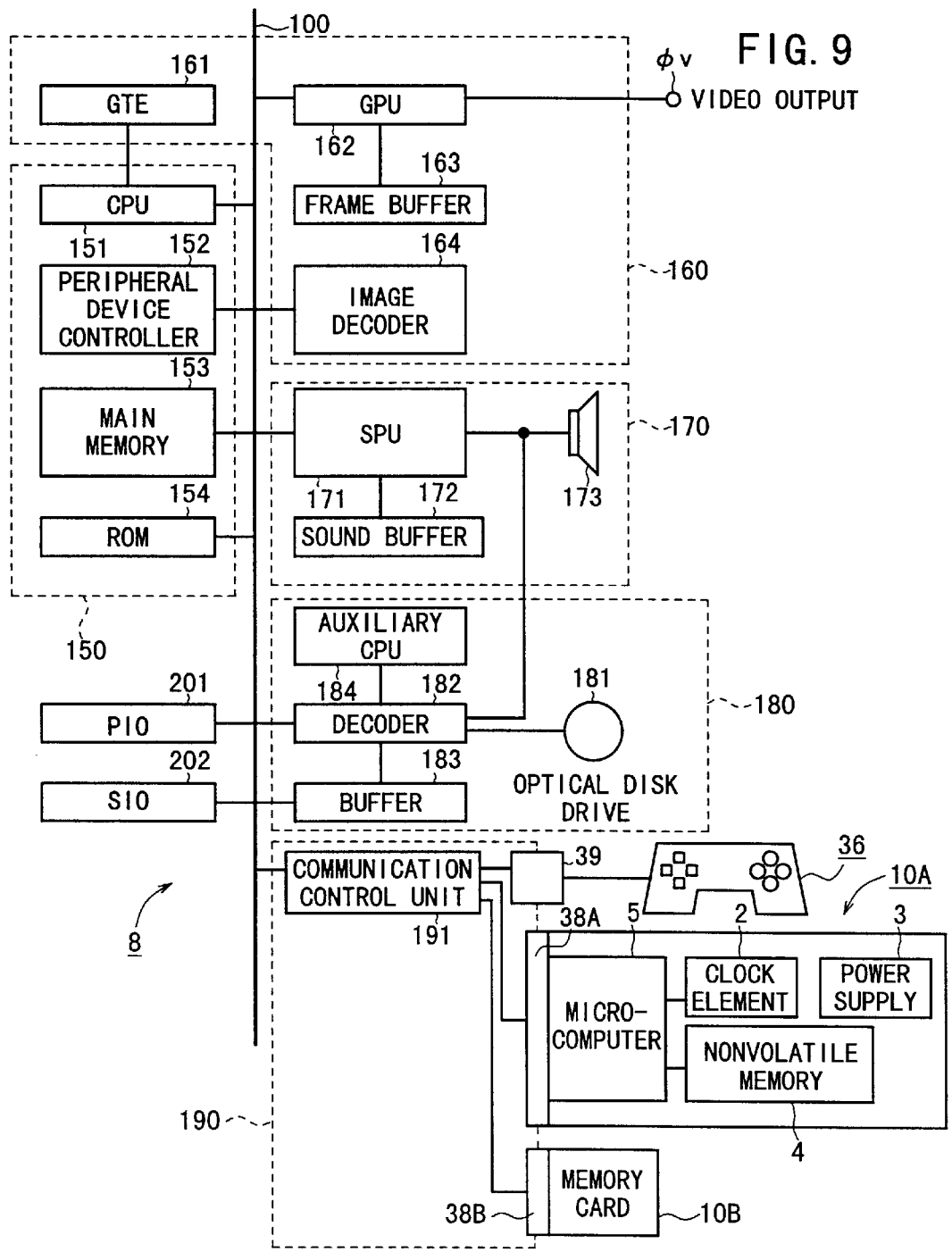
FIG. 9 is a block diagram of the video game apparatus, showing the main apparatus and memory cards.

FIG. 8 shows the manner in which the main apparatus 9 and the memory card 10 are connected for coordinated operation in the video game apparatus 8. FIG. 9 shows in block form major parts of the video game apparatus 8 at the time the main apparatus 9 and the memory card 10 are thus connected.

As shown in FIG. 9, the video game apparatus 8 generally comprises a control system 150 including a central processing unit (CPU) 151 and peripheral devices thereof, a graphic system 160 including a graphic processing unit (GPU) 162 for generating and storing image data in a frame buffer 163, a sound system 170 including a sound processing unit (SPU) 171 for generating music sounds, effect sounds, etc., an optical disk controller 180 for controlling optical disk in which an application program is recorded, a communication controller 190 for receiving signals from the controller 36 and controlling the supply of data to and the reading of data from memory cards 10A, 10B which store video game settings, and a bus 100 interconnecting the control system 150, the graphic system 160, the sound system 170, the optical disk controller 180, and the communication controller 190.

The control system 150 comprises a CPU 151, a peripheral device controller 152 for controlling interrupts and direct memory access (DMA) transfer, a main memory 153 comprising a random-access memory (RAM), and a read-only memory (ROM) 154 storing a program such as an operating system for managing the main memory 153, the graphic system 160, the sound system 170, etc.

The CPU 151 executes the operating system stored in the ROM 154 to control the video game apparatus 8 in its entirety. The CPU 151 comprises a 32-bit RISC-CPU.

When the video game apparatus 8 is turned on, the CPU 151 of the control system 150 executes the operating system stored in the ROM 154 to control the graphic system 160, the sound system 170, etc. When the operating system is executed, the CPU 151 initializes the video game apparatus 8 in its entirety for checking its operation, and thereafter controls the optical disk controller 180 to execute an application program of a video game recorded in an optical disk. When the application program of a video game is executed, the CPU 151 controls the graphic system 160, the sound system 170, etc. depending on input signals entered by the user to control the display of images and the generation of music sounds, effect sounds, etc.

The graphic system 160 comprises a geometry transfer engine (GTE) 161 for performing coordinate transformation, etc., a GPU 162 for generating image data according to graphic commands from the CPU 151, a frame buffer 163 for storing image data generated by the GPU 162, and an image decoder 164 for decoding image data which has been compressed and encoded by an orthogonal transform process such as a discrete cosine transform process.

The GTE 161 has a parallel processing mechanism for performing a plurality of arithmetic operations parallel to each other, and can carry out coordinate transformations, light source calculations, matrix or vector calculations at high speed in response to a request from the CPU 151. Specifically, for a flat shading process to fill one triangular polygon with a single color, the GTE 161 can perform a maximum of about 1,500,000 polygon coordinate calculations per second. Therefore, the video game apparatus 8 can perform high-speed coordinate calculations while reducing the burden on the CPU 151.

The GPU 162 generates and stores polygon image data, etc. in the frame buffer 163 according to a graphic command from the CPU 151. Specifically, the GPU 162 can generate a maximum of about 360,000 polygons per second.

The frame buffer 163, which comprises a dual-port RAM, is capable of simultaneously storing image data transferred from the CPU 162 or the main memory 153 and reading stored image data for display. The frame buffer 163 has a storage capacity of 1 Mbyte, and is handled as a 16-bit matrix composed of a horizontal array of 1,024 pixels and a vertical array of 512 pixels. The frame buffer 163 has a display area for storing image data to be outputted as video output data, a CLUT (Color Look-Up Table) area for storing a CLUT to be referred to when the GPU 162 generates polygon image data, and a texture area for storing textures to be coordinate-transformed and mapped onto polygons generated by the GPU 162. The CLUT area and the texture area can dynamically be changed as the display area is changed.

The GPU 162 can perform, in addition to the flat shading process, a Gouraud shading process for determining colors in polygons by interpolating intensities from the vertices of the polygons, and a texture mapping process for mapping textures stored in the texture areas onto polygons. For performing the Gouraud shading process or texture mapping process, the GTE 161 can perform a maximum of about 500,000 polygon coordinate calculations per second.

The image decoder 164 is controlled by the CPU 151 to decode still or moving image data stored in the main memory 153 and store the decoded image data back into the main memory 153.

When the reproduced image data is stored in the frame buffer 163 by the GPU 162, the reproduced image data can be used as a background for an image generated by the GPU 162.

The sound system 170 comprises an SPU 171 for generating music sounds, effect sounds, etc. based on a command from the CPU 151, a sound buffer 172 for recording waveform data, etc. supplied from the SPU 171, and a speaker 173 for radiating music sounds, effect sounds, etc.: generated by the SPU 171.

The SPU 171 has an ADPCM (Adaptive Differential PCM) function to reproduce 16-bit sound data which has been modulated as 4-bit differential sound data according to ADPCM, a playback function to reproduce waveform data stored in the sound buffer 172 to generate effect sounds, etc., and a modulating function to modulate and reproduce waveform data stored in the sound buffer 172.

With these functions, the sound system 170 can be used as a sampling sound source for generating music sounds, effect sounds, etc. based on waveform data stored in the sound buffer 172 according to a command from the CPU 151.

The optical disk controller 180 comprises an optical disk drive 181 for reproducing programs and data recorded in an optical disk, a decoder 182 for decoding programs and data recorded with an error correcting code, for example, and a buffer 183 for temporarily storing data from the optical disk drive 181 to read data from the optical disk at high speed.

Sound data recorded in the optical disk and read by the optical disk drive 181 include ADPCM data and PCM data which is digital sound data converted from analog sound data.

The sound data recorded as ADPCM data representing differences of 16-bit digital data as 4-bit digital data is decoded by the decoder 182, and the decoded digital data is supplied to the SPU 171. The SPU 171 converts the decoded digital data into analog data, which is supplied to drive the speaker 173.

The sound data recorded as PCM data representing 16-bit digital data is decoded by the decoder 182, and the decoded digital data is supplied to drive the speaker 173.

The communication controller 190 has a communication control unit 191 for controlling communications with. the CPU 151 via the bus 100. The communication control unit 191 is connected to the controller connectors 39A, 39B for connection to the controller 36 which enters instructions from the user and the memory card insertion areas 38A, 38B for connection to the memory cards 10A, 10B each as an auxiliary memory device for storing video game setting data, etc.

When the application program is resumed, the CPU 151 sets the time information of the application program to the time information measured by the clock element of the memory card 10.

The controller 36 connected to the controller connector 39A or 39B has, for example, 16 instruction keys for entering instructions of the user. According to a command from the communication control unit 191, the controller 36 transmits the status of the 16 instruction keys in about 60 cycles per second to the communication control unit 191 in a synchronous communication mode. The communication control unit 191 in turn transmits the status of the 16 instruction keys to the CPU 151.

In this manner, an instruction from the user is supplied to the CPU 151, which processes the game data based on the instruction from the user according to the application program, or the game program, which is being executed.

When the application program is read, images are displayed, or image data is generated and stored, a large amount of image data need to be transferred between the main memory 153, the GPU 162, the image decoder 164, and the decoder 182. To meet such a requirement, the video game apparatus 8 performs a DMA transfer process, i.e., allows data to be transferred directly between the main memory 153, the GPU 162, the image decoder 164, and the decoder 182 under the control of the peripheral device controller 152 without requiring data processing by the CPU 151. Since the burden on the CPU 151 for data transfer is eliminated, the data can be transferred at high speed.

When it is necessary to store setting data of the video game being executed, the CPU 151 transmits the setting data to the communication control unit 191, which writes the setting data from the CPU 151 into the memory card 10A or 10B inserted in the memory card insertion area 38A or 38B.

When the video game is temporarily interrupted, the CPU 151 transmits interim data and time information to the communication control unit 191, which writes the interim data and time information from the CPU 151 into the memory card 10A or 10B inserted in the memory card insertion area 38A or 38B.

The communication control unit 191 has a built-in protective circuit for protection against electrical destruction. The memory cards 10A, 10B are isolated from the bus 100, and can be inserted or detached while the main apparatus 9 is being energized. Therefore, when the storage capacity of the memory cards 10A, 10B becomes insufficient, new memory cards can be inserted without the need for turning off the main apparatus 9. Accordingly, the game data that is required to be backed up is not lost, and a new memory card may be inserted and necessary data may be written into the new memory card.

The video game apparatus 8 can transmit time information managed by the application program of the main apparatus 9, together with data to be saved, to the memory card 10 for storage. With the time information and data being thus stored, the application program of the main apparatus 9 can temporarily be interrupted.

The video game apparatus 8 can transmit present time information produced by the clock element 2 of the memory card 10, together with saved data, to the main apparatus 9.

With the present time information and saved time being thus transmitted, the application program of the main apparatus 9 can be resumed on the basis of the data including the time information which represents the time when the application program was temporarily interrupted, and the time information which represents the time measured as the actual time elapses from the interruption.

Figure 10:
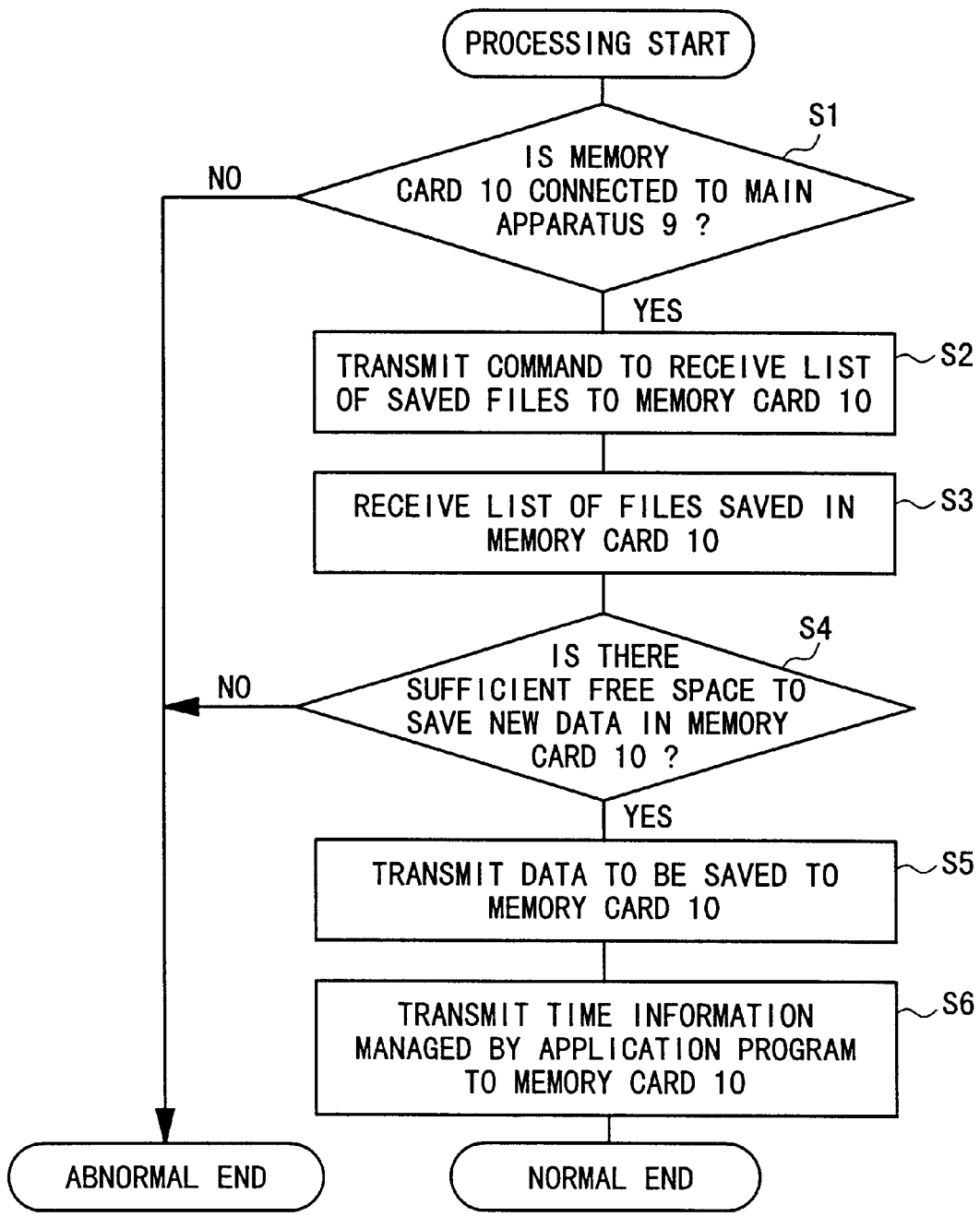
FIG. 10 is a flowchart of a process of transmitting data to be saved and time information to the memory card.

The time information managed by the application program of the main apparatus 9 is transmitted, together with the data to be saved, to the memory card 10 according to a transmitting process shown in FIG. 10.

First, in step SI, the CPU 151 of the main apparatus 9 decides whether the memory card 10 is connected to the main apparatus 9 or not. If the memory card 10 is connected to the main apparatus 9, then the CPU 151 transmits a command to receive a list of saved files to the memory card 10 in step S2.

Thereafter, the CPU 151 receives a list of saved files from the memory card 10 in step S3. Then, the CPU 151 decides whether the memory card 10 has a sufficient free space for saving new data or not in step S4.

If the memory card 10 has a sufficient free space for saving new data, then the CPU 151 transmits data to be saved to the memory card 10 in step S5. Thereafter, the CPU 151 transmits the time information managed by the application program to the memory card 10 in step S6. The process shown in FIG. 10 is now ended normally.

If the memory card 10 is not connected to the main apparatus 9 in step S1 or if the memory card 10 does not have a sufficient free space for saving new data in step S4, then the CPU 151 determines such a condition as abnormal, and processes an abnormal end.

According to the transmitting process shown in FIG. 10, the time information managed by the application program of the main apparatus 9 is transmitted, together with data to be saved, to the memory card 10. Consequently, the application program can temporarily be interrupted.

Each time a command is given to execute the above transmitting process, the memory card 10 is set to the time information managed by the application program. If the memory card 10 is initialized to the time information and is not required to be set again, then only the data transmitted and the time information managed by the application program of the main apparatus 9 are saved.

Figure 11:
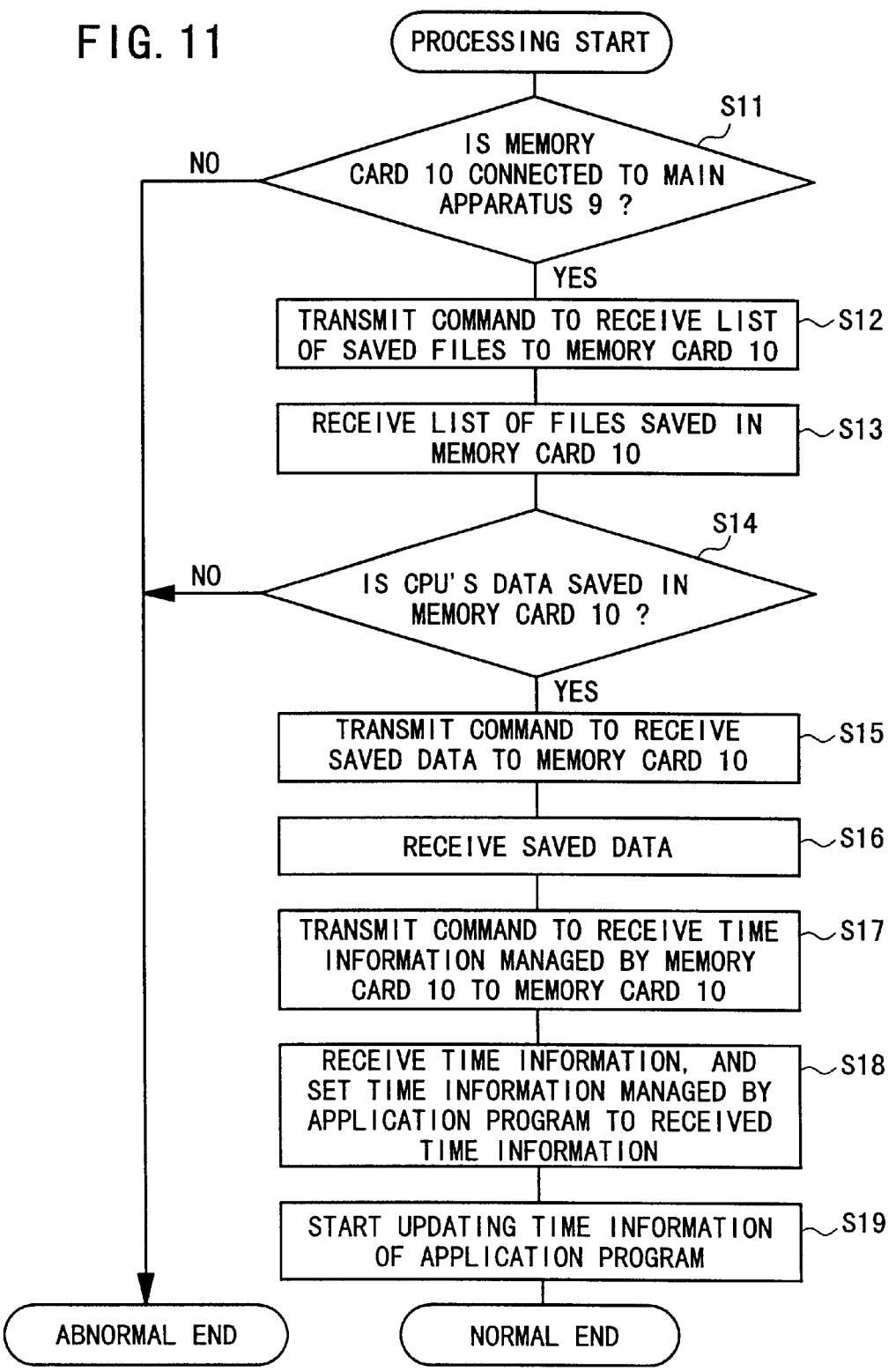
FIG. 11 is a flowchart of a process of receiving saved data and time information from the memory card, and setting time information managed by an application program of the main apparatus to the time information of the memory card.

The present time information produced by the clock element 2 of the memory card 10 is transmitted, together with saved data, to the main apparatus 9 according to a transmitting process shown in FIG. 11.

First, in step S11, the CPU 151 of the main apparatus 9 decides whether the memory card 10 is connected to the main apparatus 9 or not. If the memory card 10 is connected to the main apparatus 9, then the CPU 151 transmits a command to receive a list of saved files to the memory card 10 in step S12.

Thereafter, the CPU 151 receives a list of saved files from the memory card 10 in step S13. Then, the CPU 151 decides whether data of its own is saved in the memory card 10 or not in step S14.

If data of the CPU 151 is saved in the memory card 10, then the CPU 151 transmits a command to receive the saved data to the memory card 10 in step S15. Thereafter, the CPU 151 receives the saved data transmitted from the memory card 10 in step S16.

The CPU 151 transmits a command to receive the time information managed by the memory card 10 to the memory card 10 in step S17. Then, the CPU 151 receives the time information transmitted from the memory card 10, and sets the time information managed by the application program to the received time information in step S18. The time information which is received is the present time information measured by the clock element 2, and the time information managed by the application program is set to the present time information.

The CPU 151 starts updating the time information managed by the application program in step S19. The process shown in FIG. 11 is now ended normally.

If the memory card 10 is not connected to the main apparatus 9 in step S11 or if data of the CPU 151 is not saved in the memory card 10 in step S14, then the CPU 151 determines such a condition as abnormal, and processes an abnormal end.

According to the transmitting process shown in FIG. 11, the time information produced by the clock element 2 of the memory card 10 is, together with saved data, transmitted to the main apparatus 10. The time information managed by the application program can be set to the transmitted time information, and the application program can be resumed.

As described above, when the application program of the main apparatus 9 is temporarily interrupted, data and time information are saved in the memory card 10. At this time, the clock element 2 is set to a time and measures time. When the application program is subsequently resumed, the time information managed by the application program is set to the present time information measured by the clock element 2. Based on the above data and time processing details, the application program of a video game can be executed as follows:

The application program of a video game comprises the application program of a simulated tropical fish rearing game. In such a simulated tropical fish rearing game, the user feeds tropical fishes to rear them in the game.

In the application program of a simulated tropical fish rearing game, it is necessary to synchronize the elapse of the time in the game with the elapse of the time in the actual world for making the simulated rearing of tropical fishes closer to the actual rearing of tropical fishes. If the game is not played at night, for example, then it is necessary to recognize the elapse of the time while the main apparatus 9 is being turned off, after which the interrupted period of time needs to be reflected in the game when the game is resumed. Furthermore, it is also necessary to store in the memory card 10 interim data of the game which is produced when the application program is executed.

Figure 12C:
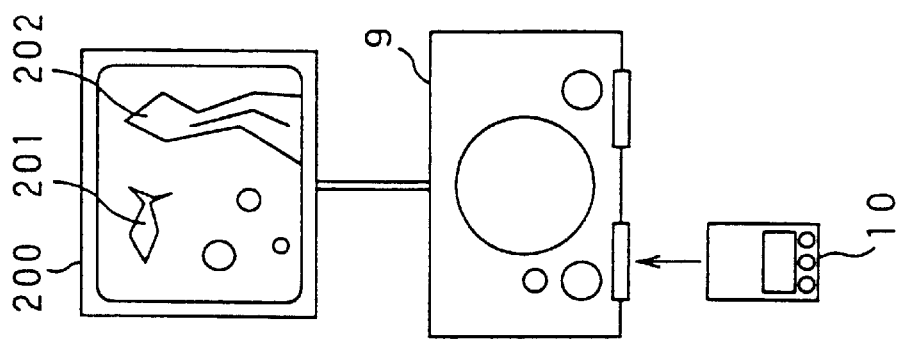
FIGS. 12A, 12B, and 12C are views showing images displayed on a monitor when the application program of a simulated tropical fish rearing game is executed.
Figure 12B:
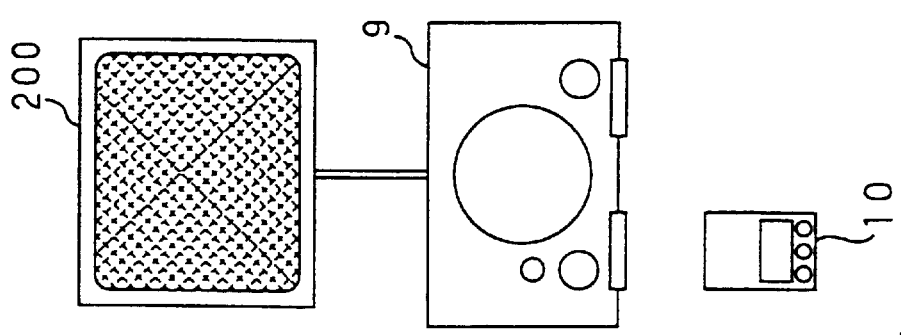
Figure 12A:
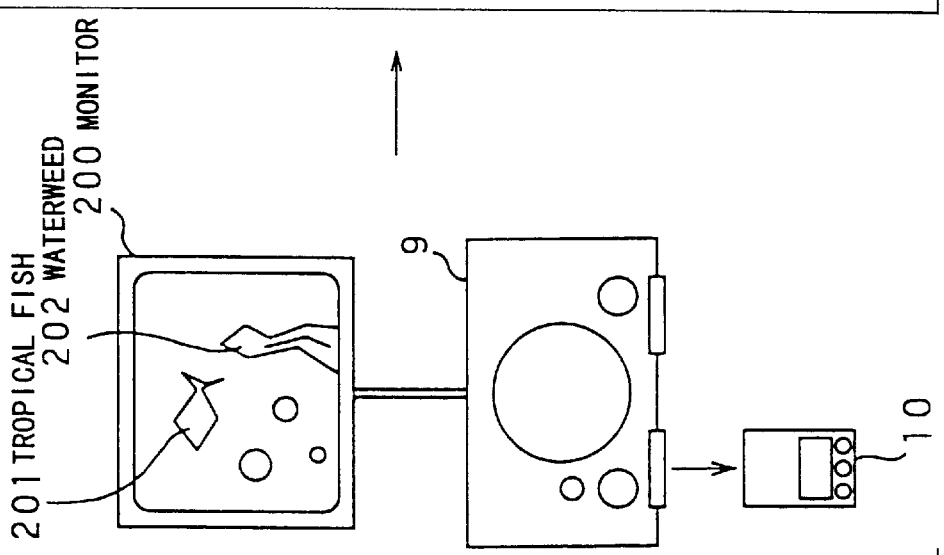
Figure 16:
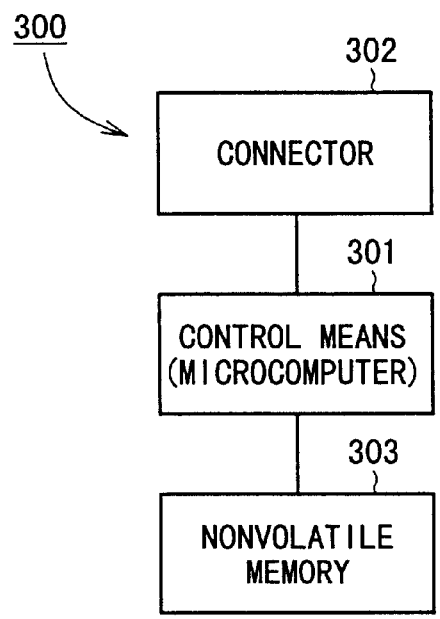
FIG. 16 is a block diagram of major components of a conventional memory card.
Figure 17:
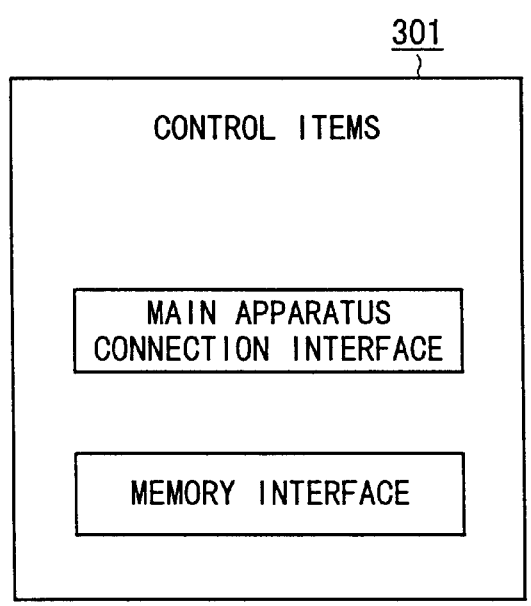
FIG. 17 is a block diagram of control items in the control means of the memory card.

An example of the application program of a simulated tropical fish rearing game is shown in FIGS. 12A through 12C. As shown in FIGS. 12A through 12C, when the simulated tropical fish rearing game is played, a tropical fish 201 and a waterweed 202 are displayed on a monitor 200, which the user observes as the application program is executed.

Immediately after the application program starts, e.g., immediately after the main apparatus 9 is turned on, the main apparatus 9 has no time information, and usually time information needs to be entered into the main apparatus 9. According to the present invention, the time information managed by the application program is set to the time information produced by the clock element 2 of the memory card 10. Thereafter, the progress of the application program is controlled by the time information managed by the application program.

For example, interim data and time information are controlled after the application program is temporarily interrupted until the application program starts to be executed, as follows:

When the application program is temporarily interrupted, the time information managed by the application program is saved, together with interim data, into the memory card 10, as shown in FIG. 12A. Thereafter, the main apparatus 9 is turned off, as shown in FIG. 12B. At this time, the time information managed by the application program of the main apparatus 9 is eliminated as the main apparatus 9 is turned off.

When the application program is resumed, as shown in FIG. 12C, the interim data and the time information produced by the clock element 2 are read from the memory card 10. If the application program has been interrupted for a long period of time, then since the long time has elapsed, the tropical fish 201 is displayed as being thinner, indicating the need for feeding, and the waterweed 202 is displayed as being grown.

Because the interrupted application program is resumed using the time information measured as the time in the actual world, it can reflect displayed image changes including a thinner image of the tropical fish 201, indicating the need for feeding, and a grown image of the waterweed 202.

The elapse of the time during the interruption of the application program is recognized by comparing the time information obtained at the time the application program was interrupted and the present time information measured by the clock element 2 of the memory card 10. The application program is resuming also using data of the tropical fish 201 and the waterweed 201 at the time the application program was temporarily interrupted.

Time information may similarly be set in the application program of a game in a particular age setting, e.g., the application program of a game on warriors in a warlike age. The application program of a game on warriors in a warlike age is similar to the application program of a simulated tropical fish rearing game in that the application program proceeds in synchronism with the elapse of the time in the actual world and the progress of the application program is affected by the elapse of the interrupted period of time.

The application program of a game in a different age setting proceeds with the time of a warlike age, rather than the time in the actual world, and the elapse of the time in the game is in synchronism with the time in the actual world.

The clock element 2 of the memory card 10 is set to an initial time by an initializing operation of the application program.

The clock element 2 of the memory card 10 is set to an initial time different from a time in the actual world via communications from the main apparatus 9. Therefore, the application program which measures time from a time in the past or future can be executed. After the application program has been interrupted, it can be resumed using time information measured as the time in the actual world.

The data of the memory card 10 may need to be stored in another memory for the purpose of data backup. Specifically, the data saved in the memory card 10 may be copied to another memory card.

For copying saved data in a source memory card to a destination memory card, the time information of the destination memory card is equalized to the time information of the source memory card so that the application program can be resumed using the time information of the destination memory card.

For example, as shown in FIG. 13, the time information of the main apparatus 9 is set to the time information of the clock element 2 of the memory card 10A which serves as a source memory card, and the time information of the clock element 2 of the memory card 10B which serves as a destination memory card is set to the time information of the main apparatus 9 thus set.

Such a copying process will be described below with reference to FIG. 14.

First, in step S21, the CPU 151 of the main apparatus 9 decides whether the memory card 10A as a source memory card is connected to the main apparatus 9 or not. If the memory card 10A is connected to the main apparatus 9, then the CPU 151 transmits a command to receive managed time information to the memory card 10A in step S22. The CPU 151 sets the time information of the main apparatus 9 to the time information transmitted from the memory card 10A in step S23.

The CPU 151 starts updating the time information managed by the application program in step S24.

The CPU 151 displays a message "CONNECT MEMORY CARD TO COPY TO" on the monitor 200, prompting the user to connect the memory card 10B in step S25.

Thereafter, the CPU 151 decides whether the memory card 10B as a destination memory card is connected to the main apparatus 9 or not in step S26. If the memory card 10B is connected to the main apparatus 9, then the CPU 151 transmits the time information managed by the application program to the memory card 10B in step S27.

After the transmitted time information is copied to the memory card 10B, the CPU 151 displays a message "DO YOU WANT TO COPY TO ANOTHER MEMORY CARD ?" on the monitor 200 in step S28.

If the transmitted time information is to be copied to another memory card in step S29, then the CPU 151 displays the message "CONNECT MEMORY CARD TO COPY TO" on the monitor 200 in step S25, and copies the transmitted time information to the other memory card.

The message "CONNECT MEMORY CARD TO COPY TO" is displayed on the monitor 200 until the connection of the other memory card is confirmed in step S26.

The transmitted time information to other memory cards until there is no need to copy the transmitted time information in step S29. Then, the copying process shown in FIG. 14 comes to a normal end. If the memory card 10A as a source memory card is not connected to the main apparatus 9 in step S21, the CPU 151 determines such a condition as abnormal, and processes an abnormal end.

As shown in FIG. 15, the saved data and time information may be copied between the memory card 10A and the memory card 10B via infrared wireless communications.

Consequently, the data of the memory card 10 can easily be copied to another memory for the purpose of data backup.

By setting the time information stored in a plurality of memory cards to the same value, the data recorded in the memory cards can easily be compared in time sequence.

As described above, if the memory card 10 is used as an auxiliary memory device for the video game apparatus 8, then the time information of the application program while the video game apparatus 8 is being turned off is measured as the time in the actual world by the clock element 2 of the memory card 10.

Therefore, the time information managed by the application program which is resumed is updated by the time information obtained from the memory card 10.

Thus, even when the application program of the video game apparatus 8 has been interrupted, since the time information managed by the application program of the main apparatus 9 can be set to the time information produced by the clock element 2 of the memory card 10, the application program can smoothly be resumed.

The clock element of the auxiliary memory device 1 or the memory card 10 is not limited to the measurement of the time information managed by the application program of the main apparatus.

What is claimed is:

1. An auxiliary memory device for a video game system detachably connected to a main game apparatus and having a function to store data of the main game apparatus, comprising:

a clock unit having a clock function;

power supply means for supplying an electric power;

memory means for storing data of at least the main game apparatus; and communication means for communicating with the main game apparatus, wherein said clock unit is set to a time based on a time setting operation of and according to a progression of time determined by an application program of the main game apparatus.

2. An auxiliary memory device according to claim 1, wherein said clock unit is an clock element supplied with the electric power from said power supply means for continuing a time measuring operation.

3. An auxiliary memory device according to claim 1, wherein time managed by the application program of the main apparatus is set by time information of said clock unit.

4. An auxiliary memory device according to claim 3, wherein when the application program of the main apparatus is started, the data stored in said memory means and the time information of said clock unit are transmitted to the main apparatus, and the time information managed by the application program of the main apparatus is set by the time information of said clock unit.

5. An auxiliary memory device according to claim 1, wherein said progression of time determined by the application program is different from real time.

6. An auxiliary memory device according to claim 3, wherein said memory means stores at least time information produced when said application program is temporarily interrupted.

7. A method of setting time for a video game system, comprising the steps of:

providing a main game apparatus and an auxiliary memory device detachably connected to said main game apparatus, wherein said auxiliary memory device and said main game apparatus jointly make up said video game system;

setting time information managed by an application program of said main game apparatus based on time information of a clock unit of said auxiliary memory device; and setting said clock to a time based on a time setting operation of and according to a progression of time determined by the application program of the main game apparatus.

8. A method according to claim 7, wherein said progression of time determined by the application program is different from real time.

9. A game system comprising:

a main game apparatus having a processor for processing data transmitted via communication means; and an auxiliary memory device having memory means for storing data to be transmitted to at least said main game apparatus, and a clock unit having a clock function, wherein time information managed by an application program of the main apparatus is set by time information of said clock unit which is transmitted via said communication means, and wherein said time information of the clock unit is set to a time based on a time setting operation of and according to a progression of time determined by the application program of the main game apparatus.

10. A game system according to claim 9, wherein said progression of time determined by the application program is different from real time.

11. A game system according to claim 9, wherein said memory means stores at least time information produced when said application program is temporarily interrupted.

12. A game system according to claim 11, wherein when said application program of said main apparatus is temporarily interrupted, said main apparatus sends a command for setting time information to said auxiliary memory device;

said auxiliary memory device sets the time information of said clock unit to a time in response to said command; and said clock unit starts measuring time from the set time.

13. A game system according to claim 11, wherein for resuming said application program of said main apparatus, said auxiliary memory device is inserted in said main apparatus, and transfers a present time information which is being continuously measured by said clock unit, together with saved data including the time information, to said main apparatus.

14. A game system according to claim 13, wherein the time information included in the saved data represents time when said application program was temporarily interrupted;

the present time information from said clock unit represents the time measured in said auxiliary memory device as the actual time elapses; and the time information managed by said application program is set by the time information included in the saved data and the present time information thus measured.

15. A game system according to claim 14, wherein said main apparatus resumes said application program whose time information is set to the time information reflecting a period from temporary interruption to the resumption, which period has been measured as the actual time has elapsed.

16. A game system according to claim 15, wherein said application program processes data to include a progress during the elapsed time based on elapsed time data produced by comparing the time information upon the temporary interruption and the time information measured at the time of the resumption.

17. An auxiliary device capable of data communication with a main apparatus for executing an application program, said auxiliary device comprising:

a communication unit for performing the data communication with said main apparatus;

a clock unit for managing time information; and a memory unit for storing data for use in said main apparatus, wherein the time information managed by said clock unit is transmitted to said main apparatus for setting time information used in the application program executed by said main apparatus.

18. An auxiliary device according to claim 17, further comprising a connector for detachably connecting said auxiliary device and said main apparatus.

19. An auxiliary device according to claim 17, wherein said memory unit stores time information when the data communication between said auxiliary device and said main apparatus is temporarily interrupted.

20. An auxiliary device according to claim 17, wherein said memory unit stores time information when execution of the application program on said main apparatus is temporarily interrupted.

21. An auxiliary device according to claim 19, wherein said clock unit manages time information by counting time from a point of time when data communication between said auxiliary device and said main apparatus is temporarily interrupted based on the time information stored in said memory unit.

22. An auxiliary device according to claim 21, wherein said auxiliary device transmits the time information managed by said clock unit to said main apparatus when the data communication between said auxiliary device and said main apparatus is resumed according to the application program.

23. A method of setting time information for an information processing system including a main apparatus for executing an application program and an auxiliary device having a clock unit for managing time information, said auxiliary device being capable of data communication with said main apparatus, said method comprising the steps of:

executing the application program in said main apparatus;

transmitting the time information managed by said clock unit from said auxiliary device to said main apparatus; and setting time information used in the application program based on the time information transmitted from said auxiliary device to said main apparatus.

24. A method according to claim 23, wherein said auxiliary device has a memory unit for storing data for use in said main apparatus.

25. A method according to claim 23, wherein said auxiliary device has a connector for detachably connecting said auxiliary device and said main apparatus.

26. A method according to claim 24, further comprising the step of:

storing time information in said memory unit of said auxiliary device when the data communication between said auxiliary device and said main apparatus is temporarily interrupted.

27. A method according to claim 24, further comprising the step of:

storing time information in said memory unit of said auxiliary device when the application program on said main apparatus is temporarily interrupted.

28. A method according to claim 26, further comprising the step of:

managing time information with said clock unit by counting time from a point of time when data communication between said auxiliary device and said main apparatus is temporarily interrupted based on the time information stored in said memory unit.

29. A method according to claim 28, wherein said auxiliary device transmits the time information managed by said clock unit to said main apparatus when the data communication between said auxiliary device and said main apparatus is resumed according to the application program.

30. An information processing system comprising:

a main apparatus for executing an application program; and an auxiliary apparatus having a clock unit for managing time information, said auxiliary device being capable of. data communication with said main apparatus, wherein the time information managed by said clock unit is transmitted to said main apparatus for setting time information used in the application program executed by said main apparatus.

31. An information processing system according to claim 30, wherein said auxiliary device has a memory unit for storing data for use in said main apparatus.

32. An information processing system according to claim 30, wherein said auxiliary device has a connector for detachably connecting said auxiliary device and said main apparatus.

33. An information processing system according to claim 31, wherein said memory unit stores time information when the data communication between said auxiliary device and said main apparatus is temporarily interrupted.

34. An information processing system according to claim 31, wherein said memory unit stores time information when execution of the application program on said main apparatus is temporarily interrupted.

35. An information processing system according to claim 33, wherein said clock unit manages time information by counting time from a point of time when data communication between said auxiliary device and said main apparatus is temporarily interrupted based on the time information stored in said memory unit.

36. An information processing system according to claim 35, wherein said auxiliary device transmits the time information managed by said clock unit to said main apparatus when the data communication between said auxiliary device and said main apparatus is resumed according to the application program.

* * * * *